No. 696,312. Patented Mar. 25, 1902.
W. H. CAMPBELL.
AUTOMATIC BRAKE MECHANISM.
(Application filed Dec. 5, 1900.)

(No Model.) 4 Sheets—Sheet 1.

No. 696,312. Patented Mar. 25, 1902.
W. H. CAMPBELL.
AUTOMATIC BRAKE MECHANISM.
(Application filed Dec. 5, 1900.)
(No Model.) 4 Sheets—Sheet 2.

No. 696,312. Patented Mar. 25, 1902.
W. H. CAMPBELL.
AUTOMATIC BRAKE MECHANISM.
(Application filed Dec. 5, 1900.)
(No Model.) 4 Sheets—Sheet 3.

UNITED STATES PATENT OFFICE.

WRIGHT H. CAMPBELL, OF CARBONDALE, PENNSYLVANIA.

AUTOMATIC BRAKE MECHANISM.

SPECIFICATION forming part of Letters Patent No. 696,312, dated March 25, 1902.

Application filed December 5, 1900. Serial No. 38,814. (No model.)

*To all whom it may concern:*

Be it known that I, WRIGHT H. CAMPBELL, a citizen of the United States of America, residing at Carbondale, in the county of Lackawanna and State of Pennsylvania, have invented certain new and useful Improvements in Automatic Brake Mechanisms, of which the following is a specification.

My invention relates to fluid-pressure automatic brake mechanisms, the object, among others, being to effect the operation of the brakes with greater efficiency and rapidity. I also obtain by means of my improvements the full maximum pressure of the air in ordinary or service braking and the venting of the train-pipe air into the brake-cylinder in quick-action or emergency braking, at the same time preventing or avoiding the raising of the brake-pressure above the maximum limit.

By the use of my train-pipe-venting mechanism the employment of the check or nonreturn valve commonly used is done away with.

The present practice in air-brake construction is to make the auxiliary reservoir (of which there is but one) of such size that in emergency action of the brakes the air discharged into the brake-cylinder from the train-pipe will so increase the volume of air in the brake-cylinder that when the auxiliary reservoir and brake-cylinder pressures equalize the braking power exerted is calculated to the highest that can safely be used without sliding the wheels.

In service braking air from the train-pipe is not available and only that stored in the auxiliary reservoir can be admitted to the brake-cylinder, the highest braking pressure in the brake-cylinder being about twenty per cent. less than maximum or the amount which can safely be used without causing the wheels to slide on the rails.

My auxiliary reservoir is separated into two independent chambers by a suitable partition, or they may be two separate and distinct chambers, as preferable. The combined volume of both is such that when allowed to communicate with the brake-cylinder through suitable ports in the slide-valve the brake-pressure will reach the maximum; but in emergency braking the air vented from the train-pipe into the brake-cylinder would make the brake-pressure excessive, and to prevent this I make one of the reservoirs, which I will denominate the "primary" reservoir, of larger volume than the other, or "secondary," reservoir and of such capacity that the air contained therein, added to that vented into the brake-cylinder from the train-pipe in quick-action or emergency braking, will raise the brake-pressure to the maximum, the capacity of the secondary reservoir being about the same as the volume of train-pipe air that is discharged into the brake-cylinder in emergency braking or sufficient when combined with the volume of air in the primary auxiliary reservoir to bring the brake-cylinder pressure up to the maximum in service applications of the brake.

The advantages gained by the use of my improvements are full maximum pressure in service braking as well as in quick-action or emergency braking. The air locked in the secondary auxiliary reservoir during quick-action braking is utilized to operate the emergency-valve and is at once available when the brakes are released for recharging the primary auxiliary reservoir in part, thus effecting a considerable saving in both time and air, especially in service or ordinary braking. Thus I am enabled to apply the brakes to the car-wheels with greater rapidity and effectiveness than heretofore, more particularly in trains of considerable length, as well as economizing compressed air in the operation of braking by utilizing that contained in the secondary reservoir in service braking and withholding it to vent the train-pipe air in emergency braking. Each car is of course equipped with a main air-pipe, primary and secondary auxiliary reservoirs, a brake-cylinder, and a triple valve mechanism, together with the supplemental mechanism, the triple valve having connection with both reservoirs and the main air-pipe or train-pipe, as well as with the brake-cylinder. The main air-pipe has a stop-cock at or near each of its ends, to be opened or closed as required, and is fitted with flexible connections and couplings for connecting the pipes from car to car of a train, so as to form a continuous line for the transmission of compressed air from a main reservoir supplied by an air-pump on the engine. When the brakes on any car become inoperative on account of defects in the air-brake mechanism, a cock in the crossover-pipe permits that car to be "cut out," leaving the main air-pipe unobstructed for the operation of the remaining brakes. When desired, this cock may be arranged to cut out the entire air-brake mechanism or either the triple valve proper or the quick-action mechanism, according to which is defective. I accomplish these results by means of a three-way valve-casing, inserted at 55, Figs. 4 and 5, or the valve proper may be inserted therein. The valve-casing, if used, will have its three passages in such position that they will register with the main air-pipe, passage 57 to the main piston-chamber and passage 56 to the supplemental piston-chamber, respectively. The valve is provided with a groove extending around a portion of its periphery, preferably about half-way around. Now by turning the handle of the valve either the entire mechanism may be cut out or the air may be allowed to enter the main piston-chamber and not the supplemental, or vice versa, as the exigencies of the case may require, or the valve may be so turned that the groove will connect all three passages, in which case the entire braking mechanism on the car would operate.

When the brakes are off or released, but in readiness for action upon the wheels of the train, the air which fills the main air-pipe has a pressure of about seventy pounds to the square inch, and by reason of the connections referred to the pressure is exerted in the casings of the triple valves on both sides of their pistons and in the auxiliary reservoirs. At the same time passages called "release" or "exhaust" ports are open from the brake-cylinder to the atmosphere. When it is desired to apply the brakes, air is allowed to escape from the main air-pipe through the engineer's valve, thereby reducing the pressure in the main air-pipe, whereupon the then higher pressure in the auxiliary reservoirs moves the pistons of the triple valves so as to first close the passage to the exhaust-port and then open the passage to the brake-cylinder from the auxiliary reservoirs, both primary and secondary, the pistons of the brake-cylinders thereby being forced out by the compressed air admitted thereto and applying the brakes by means of suitable levers and connections. To apply the brakes with their full force has hitherto required a discharge of air from the main air-pipe sufficiently great to reduce the pressure therein from twenty to twenty-five pounds, and it has been found that while the brakes are sufficiently quick in action on comparatively short trains their action on long trains of from sixty to eighty cars is in a measure slow, particularly by reason of the fact that all the air required to be discharged from the main pipe to set the brakes must travel from the rear of the train to a single discharge-opening on the engine in service braking. This discharge of air on the engine has not only involved a serious loss of time in braking, but also a waste of air. By the use of my present improvements a quicker and more efficient action of the brakes is obtained, and air which has heretofore been wasted in the application of the brakes is now retained in the main air-pipe and auxiliary reservoirs.

My invention consists in certain details of construction and peculiar combinations of parts, such as will be described in detail hereinafter, and particularly pointed out in the claims.

In the accompanying drawings.

Figures 1, 7:
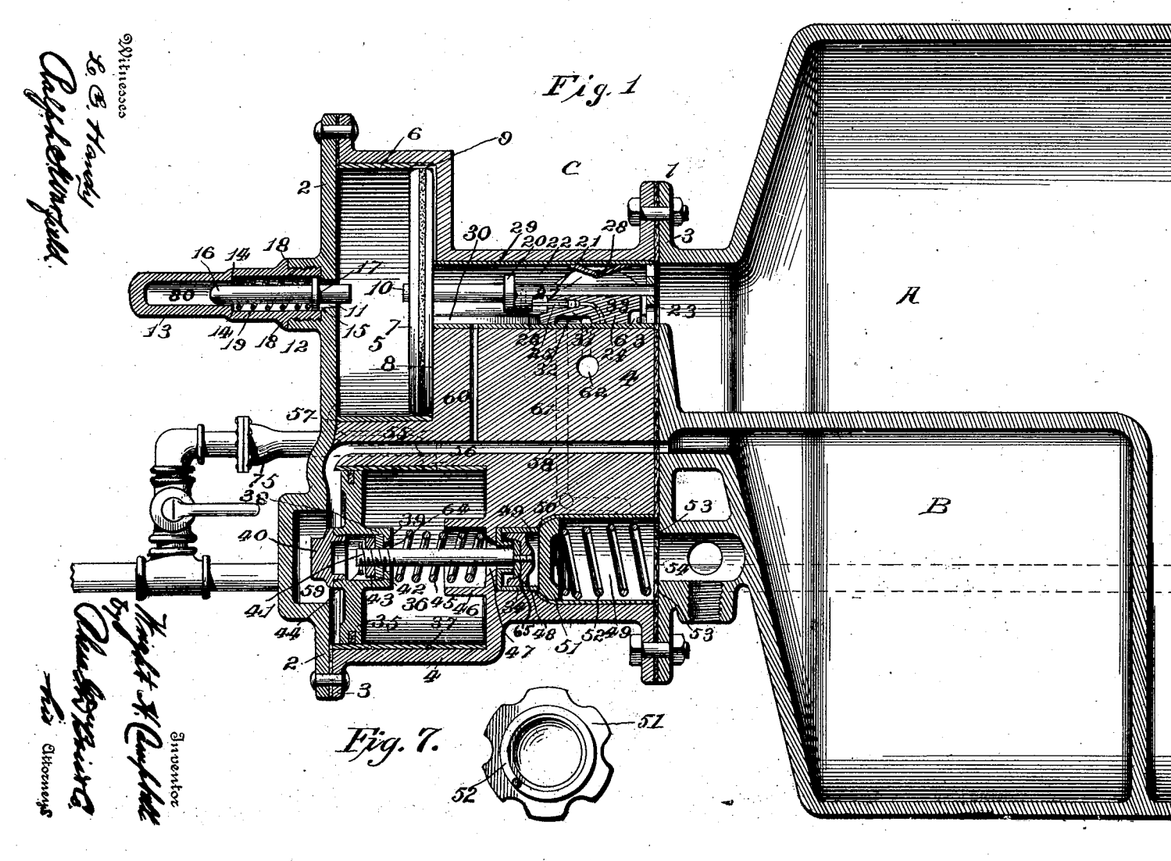
Figure 1 is a sectional view through my improvement in automatic brake mechanism, parts being shown in dotted and full lines.
Figs. 6 and 7 are detail views of the emergency and check valves, respectively.

A and B indicate the primary and secondary auxiliary reservoirs, respectively. The primary reservoir contains enough compressed air which when combined with the contents of the secondary reservoir is sufficient to raise the pressure in the brake-cylinder to sixty pounds per square inch, or without the secondary reservoir, but in combination with the air vented from the train-pipe in emergency applications of the brake, to give sixty pounds pressure when equalized into the brake-cylinder with train-pipe and reservoirs charged to seventy pounds. These two reservoirs may be made or cast in one piece with a partition between or separate from one another, as preferred, the secondary or smaller reservoir containing about one-fifth of the volume of air held by the primary reservoir, and the primary reservoir should hold about two and one-half times the volume of the brake-cylinder. These reservoirs are securely fastened to the under side of each car and to them the triple valve C, with its supplemental connections, is secured, a leather gasket 1 being placed at the adjacent faces to form an air-tight union.

Figures 2, 6:
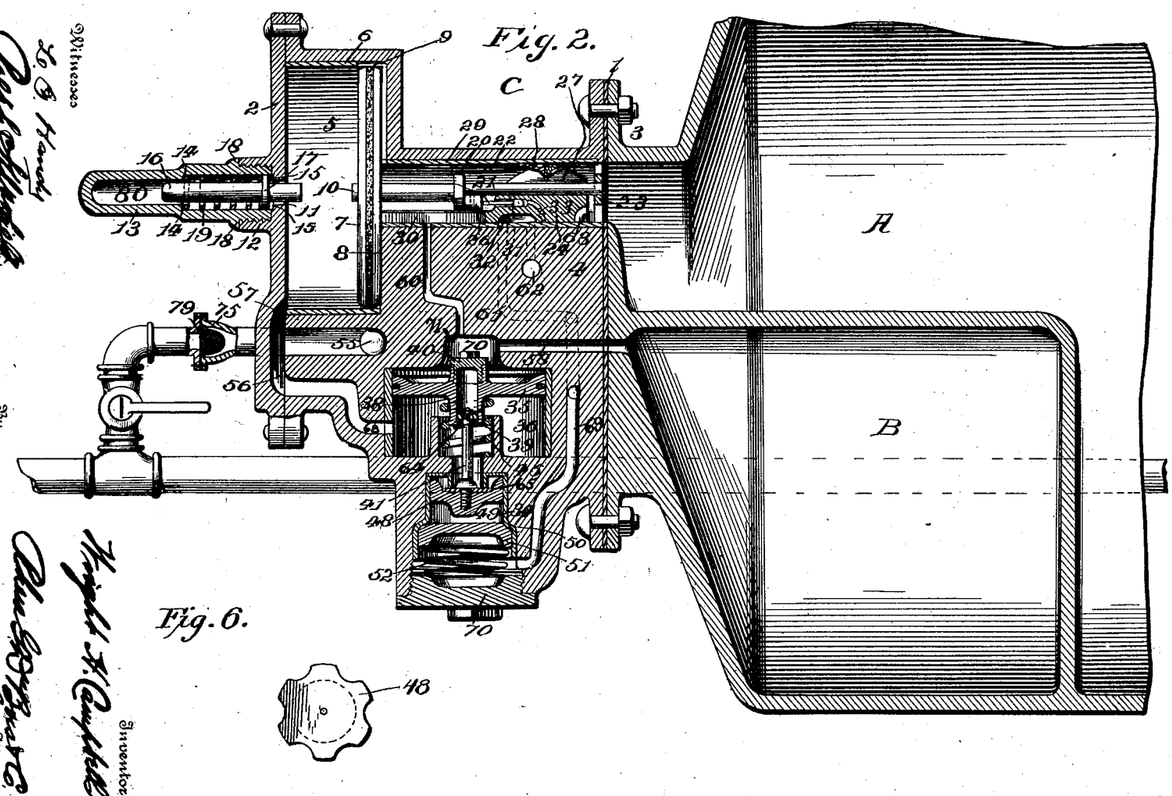
Figs. 2, 3, 4, and 5 are modifications showing different arrangements of the supplemental piston-chamber and its connections.

The triple valve consists of an integral head 2, secured to the flange 3 of the body portion 4, with suitable packing between. Within the body portion 4 a cylindrical chamber 5 is formed and provided with a bushing 6, of brass or other suitable material. This chamber has fitted therein the main piston-head 7, provided at its edge with suitable packing to form an air-tight joint between itself and the wall of the chamber 5. This piston-head abuts at one extreme of its movement against the inner wall 8 of the chamber. Adjacent to one of these walls and formed in the bushing 6 of the chamber is a small groove 9, affording communication between the chamber 5 and the slide-valve chamber 22 in the rear of the piston-head 7. Centrally of the outer face of the piston-head 7 is provided a projection 10 for a purpose hereinafter to be described. Opposite and in axial alinement with this projection an aperture 11 is formed through a boss 12 in the head 2 of the triple valve, and screwed thereinto is a hollow nipple 13. The recess 80 in the nipple is of two diameters, the innermost portion being the smaller, thus forming a shoulder 14. The aperture 11 in the head of the triple valve is of smaller diameter than the recess in the boss 12, thereby forming a shoulder 15. A rod 16, provided with an annular enlargement 17, is contained within and projects from the nipple 13 into the chamber 5, the latter having an annular ridge 18, which when the nipple is secured in place abuts against the boss 12 and the joint being provided with suitable packing. Surrounding the inner end of the rod 16 is a coiled spring 19, the inner end of which abuts against the internal shoulder 14, said spring normally forcing the rod outward, its opposite end bearing against the annular enlargement 17, which by reason of its abutment against the internal shoulder 15 prevents the disengagement of the rod and nipple. The rod is of smaller diameter than the innermost portion of the recess 80, so that it may be received therein on occasion. The rear of the main piston-head 7 is provided with a shoulder 20, to which is attached the piston-rod 21, both of which are received in the slide-valve chamber 22, the latter affording communication between the primary auxiliary reservoir A and the main piston-chamber 5. The opposite end of the piston-rod is provided with a spider 23 for guiding and centering the piston in its reciprocations as well as to allow the air in the primary reservoir to communicate with the piston-head 7. A slide-valve 24, whose length is slightly less than the distance between the spider 23 and the shoulder 20, is movably and loosely secured between them on the piston-rod 21, which latter is preferably flattened to form a bearing for the valve. This provides for a limited movement of the piston-rod before it moves the slide-valve, which it carries along by means of the spider 23 in applications of the brakes. A graduating-valve 25 is mounted on a stud 26, projecting from the piston-rod, the free end of the valve being received in the body portion of the slide-valve. An air-port 31 extends from side to side of the slide-valve, and a port 33 connects with port 31 at approximately right angles thereto in the base of the valve and is opened or closed by the graduating-valve during the independent movement of the piston-rod 21, to which it is attached. A groove 30 extends from end to end of the chamber 22 and affords a seat for the slide-valve, which latter is provided with flanges 27, struck up from its body portion on either side of the piston-rod, the flattened portion of which is received in the seat thus formed. Spring 28 is secured to these flanges and abuts and slides against the wall of the chamber 22, which is provided with a bushing 29, of brass or other suitable material. The base of the slide-valve is flat and has formed therein an L-shaped groove or port 32, which on occasion connects the brake-cylinder passage 61 with the exhaust 62, said exhaust-passage being at one side and out of alinement with the brake-cylinder passage and the various air-ports 33 and 63 in the slide-valve in order that it may not interfere with the proper working of the device. The slide-valve also covers port 60 during an emergency application of the brakes, thus preventing the air from the secondary reservoir from mingling with that in the primary reservoir and shutting it off from the brake-cylinder passage. A port 63 in the end of the valve admits air from the primary auxiliary reservoir to the brake-cylinder passage in emergency applications of the brake. The triple valve C is also provided with a supplemental piston-head 35, reciprocating in chamber 36, formed in the body portion of the valve and having a bushing 37, of brass or other suitable material. This piston-head has the usual packing around its edge to form an air-tight joint between it and the walls of the chamber 36. A hollow piston-rod 38 is formed centrally of the piston-head, its forward end projecting from the face of the piston-head and closed by means of a screw-plug 40. A shoulder 39 is formed interiorly of said rod at its inner end, leaving an aperture 64, through which the valve-stem 41 projects loosely, the valve-stem being held from disengagement with the rod 38 by means of a washer 42, secured in place by a nut 43 and a cotter-pin 44, thrust through the end of the valve-stem. The washer 42 abuts against the shoulder 39 of the rod 38. This valve-stem is permitted movement into and out of the piston-rod and may be almost entirely received therein. A coil-spring 45 surrounds the valve-stem, one of its ends bearing against the end of the piston-rod, and the other end of the spring is received in an annular flange 46, formed concentrically of the chamber 36 and bears against its inner wall. This socket or flange 46 is large enough to receive the piston-rod 38, if need be. The opposite end of the valve-stem 41 projects through the port 47 in the rear wall of the chamber 36 and surrounded by the flange 46 and terminates in a valve 48, received in a chamber 49 and seated in said port 47. This chamber has the usual bushing 34. The valve 48 and valve-stem 41 form what I shall call the "emergency-valve" and normally remains seated in the port 47, completely closing it and cutting off communication between the chambers 49 and 36. The valve is recessed at its edges to permit the escape of air therethrough. The chamber 49 has formed therein a shoulder 50, which affords a seat for a check-valve 51, held therein by means of a spring 52, the opposite end of which bears against a shoulder 53, formed by the union of the secondary auxiliary-reservoir casting with the triple valve. This check-valve is recessed on its edges in a manner similar to the emergency-valve and for the same purpose. A recess 54 in the casting is formed, which registers with the chamber 49 and is provided with openings leading to the brake-cylinder. (Not shown.)

An opening 55 is formed for the entrance of the train-pipe or main air-pipe in the triple valve, and from this opening two passages 57 and 56 conduct the air to the main piston-chamber 5 in front of the main piston-head 7 and to the supplemental piston-chamber 36 back of the supplemental piston-head 35, respectively. A passage 58 leads from the secondary auxiliary reservoir B to the supplemental piston-chamber 36 in front of the piston-head 35, a reservoir 59 being formed in the head 2 of the triple valve C for the accommodation of a certain amount of the compressed air from the secondary reservoir. A branch passage 60 leads from passage 58 to the slide-valve chamber 22, back of the main piston-head. These passages afford communication between the primary and secondary reservoirs. A passage 61 leads from chamber 22 to the chamber 49, back of the check-valve 51, thereby affording communication to the brake-cylinder from the slide-valve chamber 22. These passages 60 and 61 are controlled and governed by the slide-valve 24.

To release the brakes on long trains, it was found best to have a main reservoir-pressure in excess of train-pipe pressure, usually twenty pounds, maintained by a loaded valve attachment to the engineer's valve, as the small feed-grooves on the forward cars of a long train absorbed the air for auxiliary recharging, reducing the pressure before the rear brakes were all released.

The operation of the device will now be described. Normally while the brakes are released the secondary reservoir B is in communication with the primary reservoir A, through passages 58 and 60 to chamber 22, the slide-valve being of such open construction as to allow communication past itself, thus permitting the pressures in the two reservoirs to equalize. The brakes are in release, the train-pipe and auxiliary pressure being the same and separated by main piston 7. In this position the slide-valve 24 is in contact with the shoulder on piston stem or rod 21 and the graduating-valve 25 is seated, closing port 33. The exhaust-passages are open from the brake-cylinder to the atmosphere and port 60 from slide-valve seat to secondary reservoir is open. No other ports and passages are now in register except those for exhausting the air from the brake-cylinder. As a very slight abrasion of the seat of the slide-valve would allow considerable air under pressure to flow, if in the right place, to the brake-cylinder, and to provide for such leakage, a groove of limited size is made in the brake-cylinder, about three inches long, for its escape under the piston-packing. It is evident then that air in considerable volume must be let into the brake-cylinder, or it will escape through this groove without applying the brakes. Now enough air is drawn from the train-pipe at the engineer's valve to lower the train-pipe pressure five pounds. The auxiliary pressure now being the stronger, piston 7 is moved to the left, pulling the small graduating-valve 25 from its seat in the body of the slide-valve, at the same time bringing the spider 23 up against the end of the slide-valve and closing feed-groove 9. It will be seen that a slight difference in pressure on opposite sides of piston 7 will effect this movement, also that air entering port 31 cannot flow to brake-cylinder, as port 33 is not yet in register with passage 61. The auxiliary-reservoir pressure holds the slide-valve to its seat with considerable force, which must be overcome by auxiliary pressure on piston 7 before it can move the slide-valve to register the port 33 in the slide-valve and passage 61 in the seat. As soon as these ports register air begins to flow from both reservoirs to the brake-cylinder and will continue to flow until the pressure in the reservoirs is reduced slightly below the remaining train-pipe pressure, whereupon the piston 7 is moved back to the right, closing the small graduating-valve 25 and stopping the further flow of air to brake-cylinder without moving the slide-valve, which still holds the ports 33 and 61 in register and holds the exhaust-port 62 and passage out of register. It will now be seen that a very slight reduction will apply the brakes stronger by moving the graduating-valve from its seat, and as it requires a five-pound reduction to push the brake-cylinder piston beyond the leakage-groove and as the initial reduction must be the greatest to move the slide-valve it will be seen that this slight reduction is about right. In making a small reduction of train-pipe pressure the same amount of air will leave the auxiliary reservoir and enter the brake-cylinder by the variations of pressure on either side of piston 7, as explained; but when the auxiliary pressure by flowing to the brake-cylinder has raised the pressure in the latter until it equals itself, or, in other words, when the auxiliary and brake-cylinders equalize at sixty pounds pressure, any further reduction in train-pipe is wasting air. The slide-valve must move till ports 33 and 61 register and is always moved by the piston-rod 21. The graduating-stem 16 and its spring 19 are for the purpose mainly of stopping the outward movement of the piston when the ports are drawn into register. In practice this amounts only to a safeguard against quick action when not wanted, as the air will escape from the auxiliary reservoir to the brake-cylinder so fast as soon as the port 33 connects with port 61 that when the projection 10 on main piston 7 reaches the end of stem 16 the excess of auxiliary pressure will be insufficient to compress the spring 19 and cause quick action by further travel of the slide-valve in a service reduction. It will now be seen that the movement of the graduating-valve is for the purpose of opening or closing graduating-port 33 and gives a delicate action to the brakes, enabling the engineer to apply them and by making several subsequent reductions get the required braking force in the brake-cylinders to check the speed without stopping the train or to stop it. This independent movement permits the main piston to open and close the graduating-valve without moving the slide-valve when the brakes are on. To release brakes, the excess in the main reservoir may be suddenly let into the train-pipe, forcing each triple piston to the right and moving the slide-valve by means of the shoulder on the piston-rod 21 to release position. The slide-valve normally covers the brake-cylinder passage 61, the port 32 connecting said passage with the exhaust 62, thus allowing any pressure of air in the brake-cylinder to escape. To set the brakes in service applications, the piston 7 moves forward when the train-pipe pressure on the face thereof has been reduced, together with the piston-rod 21, which draws the graduating-valve 25 from its seat in the slide-valve 24, opening port 33 to auxiliary-reservoir pressure, which enters through air-ports 31, the piston at the same time moving past the feed-groove 9, preventing any escape of pressure from the reservoir into the main piston-chamber 5 in front of the piston-head 7. The spider 23 on piston-rod 21 next comes in contact with and moves the slide-valve 24 forward, which disconnects the exhaust and brake cylinder passages and permits port 33 to register with the latter passage. Air from both auxiliary reservoirs will now flow to the brake-cylinder through the air-ports 31 and port 33 until the pressure in the reservoirs is reduced slightly lower than the pressure remaining in the train-pipe, whereupon the piston-head 7, with its rod 21, will move backward and seat the graduating-valve, which cuts off the flow of air from the auxiliary reservoirs to the brake-cylinder by closing ports 31 and port 33, the slide-valve still maintaining its position to hold the brake-pressure in the cylinder. Additional small reductions in the train-pipe pressure will draw the graduating-valve from its seat again until the pressure in the auxiliary reservoirs equalizes with the train-pipe pressure, whereupon the graduating-valve will again be seated. Thus it will be seen that any desired brake-pressure may be obtained and maintained up to the maximum. It will also be noted that in its preliminary movement the slide-valve 24 is not moved, but is held in its seat by the pressure from the auxiliary reservoir until the spider 23 comes in contact with said slide-valve to move it forward, and when it is desired to release the brake-pressure the slide-valve maintains its position with port 33 registering with the brake-cylinder passage until the shoulder 20 on the rear face of the main piston-head comes in contact therewith to move it backward.

The independent movement of the piston and piston-rod permits the graduating-valve 25 to be opened or closed without moving the slide-valve when the brakes are on to add additional pressure to the brakes, as required. The train-pipe pressure maintained by an air-pump on the engine is equal to that in each of the auxiliary reservoirs. Thus it will be seen that if the train-pipe pressure is seventy pounds the pressure in the two reservoirs will also be seventy pounds. The pressure in the primary reservoir is exerted against the rear of the main piston-head 7, and the train-pipe pressure is exerted on the face thereof, thus retaining the piston in the backward extreme of its travel. The train-pipe pressure in the supplemental chamber is exerted on the rear of the supplemental piston-head 35, and the pressure from the secondary reservoir is applied against the face thereof, thus offsetting each other and retaining the supplemental piston in its forward extreme limit of travel. The slide-valve 24 in chamber 22 allows the air in the brake-cylinder to exhaust through recess 54, chamber 49, passage 61, and port 32, the latter connecting with exhaust-passage 62. The emergency-valve 48 is retained on its seat in the port 47 by means of the spring 45, closing chamber 49 to the train-pipe pressure, and the check-valve 51 rests on its seat 50. This is the normal position of the parts when the brakes are off.

In emergency braking, when it is desired to set the brakes with as much rapidity and force as is possible, the slide-valve 24 travels farther than it does in service application of the brake and covers the passage 60, thus cutting off communication between the two reservoirs and preventing the air in the secondary auxiliary from flowing into the brake-cylinder through air-ports 31 and 33.

A sudden reduction of, say, ten pounds in the train-pipe pressure in chambers 5 and 36 causes the then stronger auxiliary pressure to force piston 7 forward and to the left, the projection 10 coming in contact with the rod 16 and compressing the coiled spring 19, which acts as a cushion for the piston-head 7. The main piston-rod 21 is moved forward, together with the slide-valve 24, until the passage 60 is covered by the slide-valve, thus preventing the passage of air from the secondary auxiliary reservoir to the brake-cylinder. In its forward movement the slide-valve has interrupted the flow of air from both reservoirs to the brake-cylinder by closing the passage 61 momentarily; but the connection between the primary reservoir and the brake-cylinder passage 61 is reëstablished through port 63 in the end of the slide-valve. The air in the secondary reservoir cut off from the slide-valve chamber 22 being at about full pressure, forces the supplemental piston-head 35 backward to the right, overcoming the resistance of the heavy coiled spring 45, (the train-pipe pressure, as before stated, having been reduced,) which holds the emergency-valve 48 in its seat in the port 47, against the train-pipe pressure and allows the train-pipe pressure to unseat the emergency-valve 48 and the check-valve 51 against the tension of the coiled spring 52, thus gaining for itself admittance to the chamber 49 and recess 54, whence it flows to the brake-cylinder. When the pressure of the train-pipe air equalizes with that in the brake-cylinder, the tension of the spring 45 causes the emergency-valve to close, thus retaining the pressure in the brake-cylinder independent of the check-valve 51. The air from the secondary auxiliary reservoir is always in contact with the head of the piston 35, the extreme travel of the slide-valve 24 retaining it there at about full pressure and preventing it from equalizing with that in the primary auxiliary reservoir and brake-cylinder during emergency braking. It will be seen also that in its preliminary travel the slide-valve admits air from both auxiliary reservoirs to the passage 61, leading to the brake-cylinder. This is in service applications of the brake; but in quick-action or emergency braking the valve travels farther and closes the port 60, as well as passage 61, thus preventing access from either reservoir to the brake-cylinder, but by moving forward a little farther effecting a second admission of air from the primary auxiliary reservoir to the brake-cylinder passage 61 through port 63 in the rear of the slide-valve.

In the general form of braking mechanism a reduction in train-pipe pressure of from twenty to twenty-five pounds is necessary to get the full braking power, as the pressure in the auxiliary reservoir must expand into the brake-cylinder as much as possible, and the train-pipe pressure must be reduced until the auxiliary pressure is the stronger in order to move the piston and allow this equalization between the auxiliary reservoir and the brake-cylinder to take place.

With the same train-pipe and auxiliary-reservoir pressures the following figures give the reductions in train-pipe and storage-reservoirs and the brake-pressures obtained in the Westinghouse and my improvements.

Westinghouse:
Train-pipe pressure, 70 pounds, reduced by 20 pounds........ 50 pounds.
Auxiliary-reservoir pressure, 70 pounds, expanded to......... 50 pounds.
Brake-cylinder pressure, 00 pounds, raised to............ 50 pounds.
and in emergency action it is 60 pounds.

My improvement:
Train-pipe pressure, 70 pounds, reduced by 10 pounds........ 60 pounds.
Storage-reservoirs pressure, 70 pounds, expanded to......... 60 pounds.
Brake-cylinder pressure, 00 pounds, raised to the maximum....................... 60 pounds.
and in emergency action it is 60 pounds.

By this it will be seen that I effect a saving of fifty per cent. in train-pipe reductions and obtain a twenty-per-cent. increase in brake-cylinder pressure in service braking with a corresponding saving in time.

Among the features of novelty possessed by my device over those shown in the prior art are the following: In the triple valve a chamber 49 affords direct communication between the supplemental piston-chamber 36 and the brake-cylinder, and the passage 60 in the slide-valve seat or groove 30 maintains communication normally and in service applications of the brakes between the primary and secondary auxiliary reservoirs A and B, respectively. It will be seen, therefore, that in service braking, when a slow reduction of the train-pipe pressure in the two chambers 5 and 36 is made, that the air will flow from the secondary reservoir B along passages 58 and 60 to chamber 22 and through ports 31 and 33 to the brake-cylinder passage 61, together with the air from the primary auxiliary reservoir A, thus preventing the supplemental piston 35 from being operated. In emergency braking, however, where a sudden reduction of the train-pipe pressure is effected, the rapid or quick action results by means of the slide-valve in its extreme of travel cutting off communication between the two reservoirs by closing passage 60 and preventing the air in the secondary auxiliary reservoir from expanding into the brake-cylinder. This air therefore acts against the face of the supplemental piston-head 35, forcing it inward toward the train-pipe pressure, which has been reduced and is now the weaker. The emergency-valve is free to move either way as soon as the tension of the spring is relaxed, according to which pressure is the stronger, the brake-cylinder pressure which would force it back into its seat or the train-pipe pressure which would operate to unseat it, and when the train-pipe pressure has been reduced by expansion into the chamber 49, recess 54, and brake-cylinder until the pressure in the latter (being added to by the pressure in the primary reservoir) is greater than the train-pipe pressure then the emergency-valve would be closed by the back pressure from the brake-cylinder, which would be retained therein until released by the backward movement of the slide-valve 24 registering the exhaust-port 32 with passage 61 and exhaust 62. I thus practically do away with the check-valve usually employed, but retain it in my construction for the reason that the violent rush of the air in quick-action or emergency braking carries dirt, cinders, &c., with it, which are liable to lodge on the valve-seats, and thus cause a leak, which would be a serious disadvantage at this point. To overcome this defect, I form a rubber seat 65 on the valve-stem 41 for the emergency-valve 48 to rest upon.

To return the parts to their normal positions and release the brakes, all that is necessary is to raise the train-pipe pressure to its usual amount. A substantial reversal of the movements heretofore described will follow. The main piston 7 will be forced backward against the reduced pressure of the primary auxiliary reservoir, which has been lowered by expansion into the brake-cylinder, to its initial position, the entrance of the train-pipe air being so disposed that the forward movement of the main piston cannot close it. This construction prevents the locking of the pressure in the brake-cylinder. The backward movement of the main piston carries with it the slide-valve 24 to its extreme inward limit of movement, uncovering passage 60, which restores communication between the two reservoirs, and relieving the pressure from the secondary auxiliary on the face of the supplemental piston, which pressure now expands into the primary auxiliary and tends to restore a portion of its pressure. When the slide-valve is returned, it connects the exhaust with the brake-cylinder passage through the port 32. The pressure having been reduced in the auxiliary reservoirs by its expansion into the brake-cylinder and to bring it up to its normal amount, the feed-groove 9 in the main piston-chamber 5 is formed, whereby the train-pipe air at seventy pounds pressure passes back of the main piston-head and into the chamber 22, whence it travels through to the primary auxiliary reservoir and through passage 60 and passage 58 to the secondary auxiliary reservoir. This feed-groove 9 is so small that it has no effect in retarding the movement of the main piston-head in service or emergency braking, as the air cannot escape out of the groove fast enough to make any appreciable difference. At the same time of course the train-pipe air is flowing into the chamber 36 back of the supplemental piston-head, which latter is prevented from passing the opening 56, admitting the train-pipe air, by the annular flange 46, and the pressure of the train-pipe air forces the supplemental piston forward to its extreme forward limit of movement; nor can the piston project so far as to cut off the communication between the reservoir 59 and the secondary reservoir B by means of passage 58 on account of the construction of the valve-stem and the emergency-valve, the latter held on its seat and preventing any further forward movement of piston 35.

In the Westinghouse mechanism the auxiliary air from the reservoir must pass through a port to get to the supplemental piston-chamber, where it has to accumulate until there is sufficient pressure to move the piston.

In my device the pressure from the secondary auxiliary reservoir is right there against the piston-head 35, and an easier and more speedy opening of the emergency-valve is the result, saving considerable time in the application of the brakes on a long train.

Fig. 2 discloses a modification of the above-described device, in which the supplemental piston-chamber 36 and its connections are shown as integral with the main piston-chamber of the triple valve, but may be made separable therefrom and attached at right angles thereto by a suitable flange and bolts with a gasket between, forming an air-tight joint. It has suitable passages for the entrance of the train-pipe air to the main and supplemental piston-chambers and a passage for venting the train-pipe air from the supplemental piston-chamber to the brake-cylinder, as in the former construction, with the exception that the train-pipe air enters from one side at 68 and the passage to the brake-cylinder 69 traverses the opposite side of the casting from chamber 49 upward (in the drawings) and registering with a passage 61 in the main casting 4, leading to the brake-cylinder. An internally-recessed screw-plug 70 closes the end of chamber 49, and the check-valve spring 52 bears against this plug. The head 35 of the supplemental piston is opposite passage 60, which connects with a recess 71, and passage 58 from the secondary reservoir also communicates with said recess.

Figure 3:
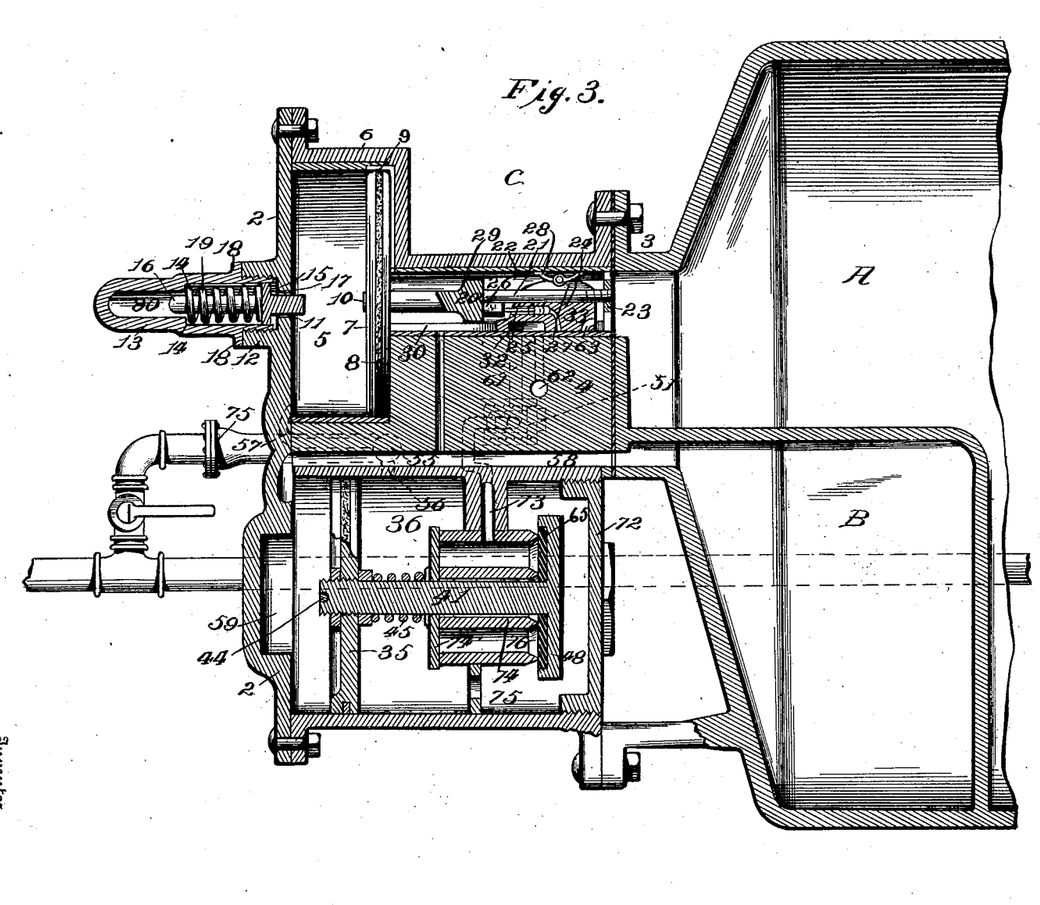

In the modification shown in Fig. 3 the two auxiliary reservoirs are likewise shown integral, but may be constructed separately, with the supplemental mechanism being entirely independent of the triple valve proper. The supplemental piston-chamber 36 is shown enlarged and provided with the piston-head 35. The rear end of the chamber is closed by a screw-plug 72. Extending into the chamber is a passage 73, the inner end of which is formed into a hollow bearing 74, of brass or other suitable material, through which the valve-stem 41, connected with the piston-head 35, projects. The face of this bearing is closed by a plate 74', except where the valve-stem projects, the whole being supported by a leg 75. The rear face of the bearing is open, forming a double valve-seat 76, against which the rubber-faced emergency-valve 48 abuts. The passage 73 leads to the brake-cylinder, and the operation is substantially the same as before described. The train-pipe air bears against the rear face of the valve 48 and the rear face of the piston-head 35. A light spring coiled around the valve-stem 41 bears against the piston and the plate 74' at its opposite ends. The excess of pressure in the secondary auxiliary reservoir causes the valve to open, allowing the train-pipe air to rush into the passage 73, leading to the brake-cylinder. The emergency-valve, however, unlike the one shown in the main construction, is not self-closing, and the check-valve 51, suitably held in its seat by means of the spring 52, is necessary.

Figure 4:
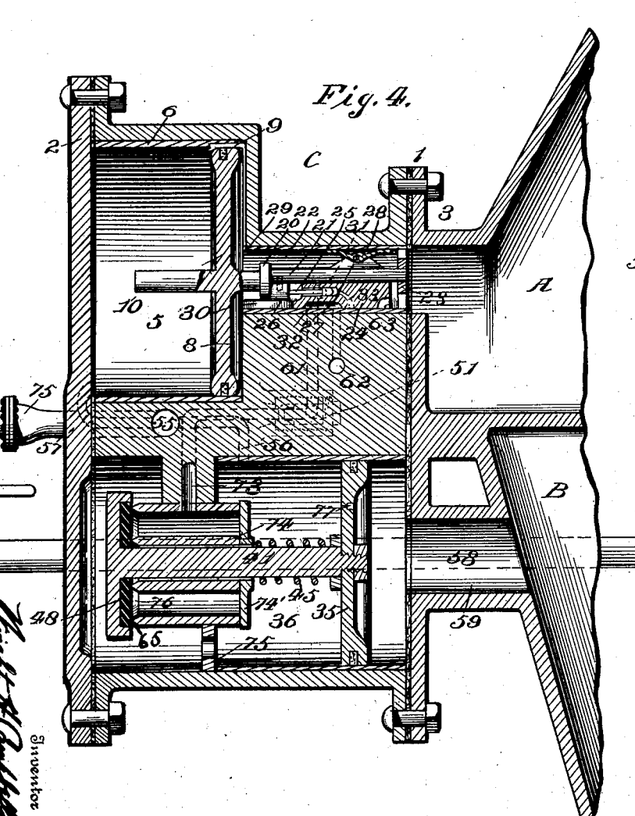
Figure 5:
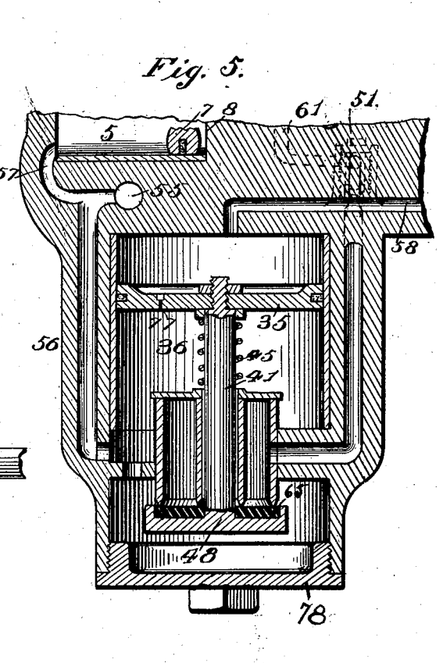

Figs. 4 and 5 are further modifications of my improved air-brake, in Fig. 4 of which the supplemental valve mechanism is reversed and in Fig. 5 the supplemental valve mechanism is shown at right angles to the triple valve proper. The train-pipe air enters the valve through passage 57 to the main piston-chamber and through passage 56 to the supplemental piston-chamber 36.

The piston-head 35 has an aperture 77 formed therein to allow the pressure in the secondary reservoir to be restored to the maximum amount by the entrance of train-pipe air after the brakes are released, there being no other entrance for the train-pipe air to the secondary auxiliary reservoir. The slight opening admits of the air exhausting from the secondary reservoir to a small degree and a slight reduction of pressure in the train-pipe would not operate to move the supplemental piston-head 35, governing the emergency-valve; but the supplemental piston is only used in emergency braking when a great reduction is made in the train-pipe pressure. In such event the air cannot escape through aperture 77 fast enough and the supplemental piston will operate as usual. The body portion of the casting in which the supplemental mechanism is contained is provided with a screw-cap 78, Fig. 5, of larger diameter than the valve 48 and its seat to admit of repairs being made or worn parts exchanged for new. A strainer 79 may also be provided at 75, the point of entrance of the train-pipe air, to catch the dirt blown in by the main air-pipe and prevent it from doing damage to the parts.

It is evident that slight changes other than those herein described might be made in the form and arrangement of the several parts described without departing from the spirit and scope of my invention, and hence I do not wish to limit myself to the exact construction herein set forth; but,

Having thus fully described my invention, what I claim as new, and desire to secure by Letters Patent, is as follows:

1. In a fluid-pressure braking mechanism, the combination with triple and auxiliary valve devices provided with main and supplemental pistons and piston-chambers, of primary and secondary reservoirs connected to and having communication with the triple and auxiliary valve devices and with each other respectively, means whereby the auxiliary-valve device is held inoperative during service applications of the brake, pressure from the secondary reservoir aiding the primary reservoir in said service applications, and means connected with the main piston and operated by pressure from the primary auxiliary reservoir whereby to close the communication between the two reservoirs during emergency applications of the brakes.

2. In an automatic braking mechanism, the combination with a main air-pipe, of primary and secondary auxiliary reservoirs, a brake-cylinder and a triple valve provided with a slide-valve, the preliminary travel of which admits air to the brake-cylinder from both reservoirs and whose further travel locks the contained air in the reservoirs and subsequently effects a second admission of air to the brake-cylinder from the primary auxiliary reservoir only.

3. In an automatic fluid-pressure brake mechanism, the combination with main and supplemental piston-chambers and primary and secondary reservoirs connected therewith, of pistons in the piston-chambers, a main air-pipe having direct open communication with the piston-chambers, its pressure being exerted against the pistons therein, passages connecting the brake-cylinder and the secondary auxiliary reservoir, respectively, with the supplemental piston-chamber on either side of the piston therein, whereby the secondary reservoir normally opposes an equal pressure to the train-pipe pressure in the supplemental piston-chamber, a valve normally closing the passage from the supplemental chamber to the brake-cylinder, and means whereby to cause the pressure of the air in the secondary reservoir to actuate the piston in the supplemental chamber whereby to open the valve and permit the train-pipe pressure to exhaust into the brake-cylinder.

4. In an automatic brake mechanism, the combination with a main air-pipe, primary and secondary auxiliary reservoirs and a brake-cylinder, of a triple valve provided with a supplemental chamber, said chamber having direct open connections with the main air-pipe, and the secondary reservoir and in communication with the brake-cylinder, respectively, an emergency-valve controlling the communication between the main air-pipe and the brake-cylinder passages, a piston reciprocating in said supplemental chamber, said emergency-valve and piston being so constructed that, operating together, they admit air from the main air-pipe to the brake-cylinder and retain it therein.

5. In an automatic brake mechanism, the combination with primary and secondary reservoirs, of a triple valve provided with main and supplemental piston-chambers, and pistons therein, passages connecting the primary and secondary reservoirs with the main and supplemental piston-chambers, respectively, a slide-valve in the passage connecting the main piston-chamber with the primary reservoir, the valve provided with ports, a brake-cylinder, a brake-cylinder passage leading between the brake-cylinder and the slide-valve chamber, passage in the triple valve leading between the secondary reservoir and the slide-valve chamber to permit the air in both reservoirs to enter the brake-cylinder passage, during service applications of the brake, an exhaust-passage, the slide-valve governing communication between the reservoirs and the brake-cylinder and the exhaust.

6. In an automatic brake mechanism, the combination with a main air-pipe, primary and secondary auxiliary reservoirs, a brake-cylinder and a triple valve, of a slide-valve operating in said triple valve, passages in said triple valve for the admission and exhaust of air to and from the auxiliary reservoirs and to and from the brake-cylinder, said slide-valve governing communication between said passages, a supplemental chamber, a piston operating therein, an emergency-valve in the rear of said piston, the operation of which is dependent upon said piston, passages from said chamber to the brake-cylinder, the main air-pipe and the secondary reservoir, respectively, a port in the rear of said supplemental chamber governed by said emergency-valve, a main piston-chamber provided with a piston and rod, a slide-valve chamber in which said piston-rod reciprocates, a slide-valve in said slide-valve chamber, said rod adapted to operate said slide-valve, means for retaining said slide-valve in its seat, a port in said valve-seat communicating with said secondary reservoir, said slide-valve adapted to open and close said port whereby to admit the pressure of air in the secondary reservoir to the brake-cylinder or to retain it in the reservoir.

7. In an automatic brake mechanism, the combination with a main air-pipe, of primary and secondary reservoirs, a brake-cylinder and a triple valve device, having main and supplemental chambers, pistons in said chambers, said reservoirs of unequal capacity and adapted jointly to raise the brake-cylinder pressure to the maximum in service applications of the brake and to act separately in emergency braking, the primary or larger reservoir to act in conjunction with air vented from the main air-pipe to raise the brake-cylinder pressure to maximum and the secondary or smaller reservoir to act on said supplemental piston, and an emergency-valve controlled by said supplemental piston, and governing the admission of air from the main air-pipe to the brake-cylinder.

8. In an automatic brake mechanism, the combination with a main air-pipe, primary and secondary auxiliary reservoirs, a brake-cylinder and a triple valve device, provided with a main piston-chamber, a piston operating therein, a piston-rod, a main slide-valve chamber affording communication between the primary reservoir and the main piston-chamber, of a supplemental piston-chamber, independent of the main piston and slide-valve chambers, a piston operating therein, a valve-chamber leading from said supplemental piston-chamber to said brake-cylinder likewise independent of the slide-valve chamber, an emergency-valve for said valve-chamber, controlled by said supplemental piston and governing the admission of air from the main air-pipe to the brake-cylinder, a check-valve for preventing the return of air from the brake-cylinder, and passages from the secondary reservoir and the main air-pipe to the supplemental piston-chamber.

9. In an automatic brake mechanism, the combination with a main air-pipe, primary and secondary auxiliary reservoirs, a brake-cylinder and a triple valve, of main and supplemental piston-chambers, pistons and piston-rods therein, a slide-valve chamber in which said main piston-rod reciprocates, passages leading to and from said slide-valve chamber to the secondary reservoir, the brake-cylinder the exhaust and the supplemental piston-chamber, respectively, a slide-valve in said slide-valve chamber provided with ports governing the admission and exhaust of air to and from said passages, said supplemental chamber having a valve-chamber connecting with the brake-cylinder, an emergency-valve operated by said supplemental piston and governing the admission of air to the brake-cylinder from the main air-pipe, passages communicating with the supplemental piston-chamber and the main air-pipe and secondary reservoir, respectively, said supplemental piston only reciprocated in emergency braking by the pressure of the air on the piston from the secondary reservoir, said pressure being locked out of the main slide-valve chamber by the movement of the slide-valve.

10. In an automatic braking mechanism, the combination with a main air-pipe, primary and secondary auxiliary reservoirs, a brake-cylinder and a triple valve device provided with main and supplemental piston-chambers, pistons and piston-rods for said chambers, valve-chambers connecting said main and supplemental piston-chambers with the primary reservoir and the brake-cylinder, respectively, a passage connecting said primary and secondary reservoirs through the medium of the main slide-valve chamber, a passage leading from said main valve-chamber to the brake-cylinder, a slide-valve in said main valve-chamber controlling the communication between the two reservoirs and the brake-cylinder, whereby in emergency braking, the flow of air from both reservoirs is cut off from the brake-cylinder and reëstablished from the primary reservoir alone, connections between the main air-pipe and the main and supplemental chambers, and a passage from the secondary reservoir to the supplemental piston-chamber.

11. In an automatic brake mechanism, the combination with a main air-pipe, primary and secondary auxiliary reservoirs, a brake-cylinder and a triple valve, provided with main and supplemental piston-chambers, of pistons and rods reciprocating therein, main slide-valve and valve chambers communicating with the main and supplemental piston-chambers and the primary and secondary reservoirs, respectively, an emergency-valve in said supplemental valve-chamber, said valve controlled by the supplemental piston and governing communication between said supplemental piston-chamber and the brake-cylinder, a slide-valve in said main slide-valve chamber, passages connecting the slide-valve chamber with the secondary reservoir and the brake-cylinder, respectively, and governed by the slide-valve, whereby the two reservoirs may be used in service braking.

12. In an automatic braking mechanism, the combination with a main air-pipe, primary and secondary auxiliary reservoirs, a brake-cylinder and a triple valve device, of main and supplemental piston-chambers in said triple valve, pistons in said chambers, a slide-valve chamber connecting the primary reservoir with the main piston-chamber, a piston-rod in said slide-valve chamber, capable of a limited independent movement, a slide-valve operated by said rod, ports in said valve, a valve-chamber connecting the supplemental piston-chamber and the brake-cylinder, a passage from said supplemental valve-chamber to said main slide-valve chamber, a passage from the secondary reservoir communicating with the main slide-valve chamber and the supplemental piston-chamber, respectively, the main slide-valve governing the passages to and from the main valve-chamber and an emergency-valve in said supplemental valve-chamber controlling communication between the supplemental piston-chamber and the brake-cylinder, said emergency-valve having a stem receivable in the supplemental piston-rod.

13. In an automatic braking mechanism, the combination with a main air-pipe, primary and secondary auxiliary reservoirs, a brake-cylinder and a triple valve device, of main and supplemental piston-chambers, pistons and piston-rods in said chambers, a slide-valve chamber connecting the primary reservoir and the main piston-chamber, a slide-valve operated by said main piston-rod, ports in said valve, a valve-chamber connecting the supplemental piston-chamber and the brake-cylinder, a passage from said supplemental valve-chamber to said main slide-valve chamber, a passage from the secondary reservoir communicating with the main slide-valve chamber, said passages governed and controlled by said main slide-valve, communication between the secondary reservoir and the supplemental piston-chamber, an emergency-valve in said supplemental valve-chamber controlling communication between the supplemental piston-chamber and the brake-cylinder, said emergency-valve having a stem receivable in the supplemental piston-rod and a spring coiled around said valve-stem for maintaining the valve in its seat.

14. In an automatic brake mechanism, the combination with a main air-pipe, primary and secondary auxiliary reservoirs, a brake-cylinder and a triple valve, of main and supplemental piston-chambers with pistons and rods operating therein, a slide-valve chamber affording communication between the main piston-chamber and the primary auxiliary reservoir, a slide-valve in said slide-valve chamber, ports in said valve, a graduating-valve secured on the piston-rod and adapted to open and close said ports, means for retaining said slide-valve in its seat, passages opening into the slide-valve chamber and controlled by said slide-valve, whereby communication between the two reservoirs, and between the exhaust and the brake-cylinder is governed, a supplemental valve-chamber affording communication between the supplemental piston-chamber and the brake-cylinder, an emergency-valve controlling the admission of air to said valve-chamber, said emergency-valve caused to operate by the movement of the supplemental piston, a passage connecting the supplemental piston-chamber and the secondary reservoir, and passages connecting the main air-pipe with the main and supplemental piston-chambers.

15. In an automatic fluid-pressure brake mechanism, the combination with a train-pipe, a brake-cylinder, primary and secondary reservoirs and a triple valve provided with main and supplemental piston-chambers, independent of each other, of pistons and piston-rods therein, a slide-valve chamber affording communication between the primary reservoir and the main piston-chamber, a passage connecting the supplemental piston-chamber with the secondary reservoir, a brake-cylinder passage leading from the brake-cylinder to the slide-valve chamber, a second passage connecting the brake-cylinder with the supplemental piston-chamber, a slide-valve in the valve-chamber governing the admission and exhaust of power to and from the brake-cylinder, ports admitting power from the train-pipe to the main and supplemental piston-chambers, and a valve in the passage connecting the supplemental piston-chamber with the brake-cylinder whereby in emergency braking the power in the secondary reservoirs is utilized to open the valve and permit power from the train-pipe to escape from the supplemental piston-chamber to the brake-cylinder.

16. In an automatic fluid-pressure brake mechanism, the combination with a triple valve provided with main and supplemental piston-chambers and pistons therein, primary and secondary auxiliary reservoirs connected, respectively, with the main and supplemental piston-chambers by passages, a brake-cylinder, and passages connecting the brake-cylinder with the passage leading between the main piston-chamber and the primary reservoir, and the supplemental piston-chamber respectively, of a valve in the last-named passage, the valve directly operated by the supplemental piston, ports leading from the train-pipe to the main and supplemental piston-chambers, a passage permitting the flow of air to the brake-cylinder from the secondary reservoir in service braking, and a valve which closes this passage during emergency actions of the brake whereupon the air in the secondary reservoir exerts its pressure against the piston in the supplemental piston-chamber to open the valve controlled by the piston and permit the entrance of air from the train-pipe to the brake-cylinder.

17. In an automatic brake mechanism, the combination with a main air-pipe, brake-cylinder, primary and secondary auxiliary reservoirs, and a triple valve provided with main and supplemental piston-chambers, of pistons and piston-rods therein, valve-chambers connecting the primary auxiliary reservoir and the brake-cylinder, respectively, with said piston-chambers, valves controlling the flow of fluid through the valve-chamber, said supplemental piston-head having a hollow piston-rod, a rubber-seated emergency-valve controlling the admission of air to the supplemental valve-chamber, the stem of said valve being loosely received within the hollow piston-rod and therein secured from disengagement, the opposite end of the piston-rod being closed by a removable plug.

18. In an automatic braking mechanism, the combination with a main air-pipe, primary and secondary auxiliary reservoirs, a brake-cylinder and a triple valve, provided with main and supplemental piston-chambers, pistons and piston-rods, of valve-chambers, connecting the primary auxiliary reservoir and the brake-cylinder, respectively, with the piston-chambers, slide and emergency valves in said valve-chambers, passages connecting the main air-pipe with the piston-chambers, the primary and secondary reservoirs with the brake-cylinder and with each other, an auxiliary reservoir in the head of the triple valve, passages connecting the secondary reservoir with the auxiliary reservoir, said auxiliary reservoir in the head of the triple valve constructed for the storage of pressure from the secondary reservoir against the head of the supplemental piston.

19. In a fluid-pressure braking mechanism, the combination with a triple valve provided with main and supplemental piston-chambers, of reservoirs, passages connecting the reservoirs with their respective piston-chambers, a slide-valve in the passage connecting the primary reservoir with the main piston-chamber, a brake-cylinder, ports connecting this slide-valve passage with the exhaust, the brake-cylinder and the secondary reservoir, the port connecting the secondary reservoir and the slide-valve passage being open both normally and in service braking whereby the air in both reservoirs is permitted to equalize and is utilized in service braking, but which air in the secondary reservoir is shut out of the brake-cylinder in emergency actions of the brakes.

20. In a fluid-pressure braking mechanism, the combination with a triple valve provided with main and supplemental piston-chambers, ports connecting the chambers with the main air-pipe, primary and secondary reservoirs communicating with their respective piston-chambers, a slide-valve in the passage connecting the main piston-chamber and the primary reservoir, a brake-cylinder, an exhaust, ports affording communication between the slide-valve passage and the brake-cylinder, the exhaust and the secondary reservoir, respectively, the slide-valve governing the ports, a port in the extreme end of the slide-valve, a passage connecting the brake-cylinder with the supplemental piston-chamber and means for normally closing this passage, whereby in emergency braking, the port in the slide-valve registers with the passage leading to the brake-cylinder, the slide-valve closing the exhaust-passage and that leading to the secondary reservoir thus causing the pressure in the secondary reservoir to open the passage from the supplemental chamber to the brake-cylinder.

21. In a fluid-pressure brake mechanism, the combination with reservoirs and a brake-cylinder, of means whereby the air from the reservoirs only is used to retard the speed in service braking, and supplemental means, the air in one of said reservoirs being utilized to operate the supplemental means whereby to cause the train-pipe air to combine with the air from the other of said reservoirs in emergency braking, the first-named means operating to prevent the air from one of the reservoirs from escaping to the brake-cylinder.

22. In a fluid-pressure brake mechanism, the combination with air-reservoirs and a triple valve provided with two chambers pistons in said chambers, adapted to reciprocate therein, the pistons normally held at the opposite extremities of their travel, means for operating one of the pistons whereby air from both reservoirs may act upon the brake gradually to the maximum pressure obtainable and means whereby air from the train-pipe acts in conjunction with air from one only of the reservoirs to operate the brakes at their maximum pressure.

23. In a fluid-pressure brake mechanism, the combination with reservoirs of a triple valve provided with piston-chambers, and pistons therein, train-pipe connections with each of said chambers, means of communication between the brake-cylinder and the primary reservoir, means of communication between the supplemental piston-chamber and the brake-cylinder, whereby the air from the primary reservoir may act upon the brakes in conjunction with air from the train-pipe in emergency braking, the air in the second auxiliary reservoir utilized to aid in replenishing the primary reservoir after the release of the brakes.

24. In an automatic fluid-brake mechanism, the combination with a triple valve, primary and secondary reservoirs, main and supplemental piston-chambers in the triple valve, pistons in the piston-chambers, of passages connecting the primary reservoir with the main piston-chamber and the secondary reservoir with the supplemental piston-chamber, passages connecting the brake-cylinder with the supplemental piston-chamber and with the passage leading between the primary reservoir and the main piston-chamber, a slide-valve in the passage leading from the primary reservoir to the main piston-chamber, the slide-valve governing the entrance of air from the secondary reservoir to the brake-cylinder, an emergency-valve governing the passage leading from the supplemental piston-chamber to the brake-cylinder and a check-valve for closing this passage to retain the air in the brake-cylinder.

25. In an automatic fluid-pressure brake mechanism, the combination with a triple valve provided with main and supplemental piston-chambers, and primary and secondary reservoirs, of passages affording communication between each of the reservoirs and each of the piston-chambers, respectively, passages permitting communication between the reservoirs, an emergency-valve being operated by pressure from the secondary reservoir, a brake-cylinder to which pressure from the train-pipe is permitted to flow when the emergency-valve is operated and a check-valve for preventing the return of air from the brake-cylinder.

26. An automatic brake mechanism comprising a triple valve, primary and secondary auxiliary reservoirs, main and supplemental piston-chambers connected with the primary and secondary auxiliary reservoirs, respectively, the two reservoirs coöperating to set the brakes in a service application, a main air-pipe having direct communication with the chambers, a passage leading from the supplemental piston-chamber to the brake-cylinder, an emergency-valve controlling this passage, a check-valve which normally closes the passage, the air from both reservoirs entering the brake-cylinder during a service application of the brakes, and the air from the primary reservoir only together with train-pipe air entering the brake-cylinder during an emergency application of the brakes.

27. In a fluid-pressure braking mechanism, the combination with a triple valve provided with main and supplemental piston-chambers, pistons and piston-rods therein, primary and secondary reservoirs connected to the main piston-chamber by means of a slide-valve chamber and a passage connecting the secondary reservoir with the supplemental piston-chamber of a brake-cylinder, passages connecting the brake-cylinder with the supplemental piston-chamber, and the slide-valve chamber, a passage affording communication between the two reservoirs, a slide-valve mounted on the main piston-rod and located in the slide-valve chamber, the slide-valve governing the entrance of air from the secondary reservoir to the brake-cylinder, and adapted to permit the maximum braking-pressure to be obtained in service braking by the combined pressures in the primary and secondary reservoirs by consecutive reductions of the train-pipe pressure.

28. The combination, in an automatic fluid-pressure braking mechanism, with a triple valve, main and supplemental piston-chambers provided with pistons therein, primary and secondary reservoirs communicating with the main and supplemental piston-chambers, respectively, ports in the chambers leading to main air-pipe and a brake-cylinder, of means for permitting the exhaust of air into the brake-cylinder from both reservoirs during service braking, and means whereby to prevent the exhaust of air from the secondary reservoir to the brake-cylinder in emergency braking.

29. In a brake mechanism, the combination with a train-pipe and brake-cylinder, of a triple valve having main and supplemental pistons and piston-chambers, a graduating-stem and spring, primary and secondary auxiliary reservoirs connecting with the triple valve and a graduating-valve operating to admit air from both primary and secondary auxiliary reservoirs to brake-cylinder, the graduating-valve, aided by the tension of said spring acting on said graduating-stem to retard or prevent the extreme travel of the main piston in service braking, said graduating-valve becoming inoperative in emergency braking.

30. In a fluid-pressure braking mechanism, the combination with triple and auxiliary valve devices provided with main and supplemental pistons and piston-chambers, of primary and secondary reservoirs connected to and having communication with the triple and auxiliary valve devices and with each other, respectively, means whereby the auxiliary-valve device is held inoperative during service applications of the brake, pressure from the secondary reservoir aiding the primary reservoir in said service applications, means operated by the main piston and actuated by the pressure in the primary auxiliary reservoir whereby the open communication between the two reservoirs is closed during emergency applications of the brakes, and means whereby to recharge the secondary reservoir simultaneously with the primary reservoir through the triple-valve device.

31. In a fluid-pressure braking mechanism, the combination with triple and auxiliary valve devices, provided with main and supplemental pistons and piston-chambers, primary and secondary reservoirs connected to and having communication with the triple and auxiliary valve devices and with each other, respectively, a brake-cylinder and means of communication between the primary reservoir and the brake-cylinder, of a slide-valve located on the main piston, ports in the slide-valve, graduating-valve adapted to open or close the ports in the slide-valve, means whereby the auxiliary-valve device is held inoperative during service applications of the brakes, and means to recharge the reservoirs simultaneously through the triple-valve device.

32. In an automatic fluid-pressure braking mechanism, the combination with a triple valve provided with main and supplemental piston-chambers, and primary and secondary auxiliary reservoirs, of passages affording communication between the primary auxiliary reservoir and the main piston-chamber and between the second auxiliary reservoir and the supplemental piston-chamber, respectively, an emergency-valve operated by pressure from the secondary reservoir, a brake-cylinder to which pressure from the train-pipe is permitted to flow when the emergency-valve is operated, and a check-valve for preventing the return of air from the brake-cylinder.

33. An automatic brake mechanism comprising a triple valve, primary and secondary auxiliary reservoirs, main and supplemental piston-chambers connected therewith, pistons therein, a main air-pipe having direct communication with the piston-chambers, means for feeding air to the reservoirs from the main air-pipe, a passage from the supplemental piston-chamber to the brake-cylinder, an emergency-valve controlling this passage, the emergency-valve controlled by the piston in the supplemental piston-chamber, the train-pipe air entering the supplemental piston-chamber behind the piston whereby to retain the emergency-valve in a closed position, a check-valve, means whereby a service reduction of pressure in the main air-pipe will permit the entrance of air from both reservoirs to the brake-cylinder, and means whereby an emergency reduction of pressure in the train-pipe will permit the entrance of air from the primary auxiliary reservoir only in combination with air from the train-pipe to the brake-cylinder, the exhaust of air from the train-pipe tending to insure the effectiveness of the emergency application of the brakes since the exhaust of train-pipe air behind the piston prevents the emergency-valve from returning to closed position.

In testimony whereof I have signed my name to this specification in the presence of two subscribing witnesses.

WRIGHT H. CAMPBELL.

In presence of—
E. C. ELY,
AL. F. BIRKETT.